United States Patent [19]

Miller et al.

[11] Patent Number: 4,691,276

[45] Date of Patent: * Sep. 1, 1987

[54] ADAPTIVE CONTROL SYSTEM FOR MECHANICAL SEAL ASSEMBLY

[75] Inventors: Alan L. Miller, Chicago, Ill.; James L. Kozlowski, Whiting, Ind.

[73] Assignee: Borg-Warner Industrial Products, Inc., Long Beach, Calif.

[*] Notice: The portion of the term of this patent subsequent to Feb. 17, 2004 has been disclaimed.

[21] Appl. No.: 789,890

[22] Filed: Oct. 21, 1985

[51] Int. Cl.$^4$ .......................... G06F 15/46; F16J 15/34
[52] U.S. Cl. ..................................... 364/148; 364/505; 364/570; 277/28; 277/901; 73/46; 73/49.3
[58] Field of Search ............... 364/148, 505, 506, 507, 364/508, 551, 570, 571; 73/40, 46, 49.2, 49.3, 52; 277/28, 81 R, 96, 901

[56] References Cited

U.S. PATENT DOCUMENTS

| | | | |
|---|---|---|---|
| 3,701,535 | 10/1978 | Born et al. | 277/28 |
| 4,197,531 | 4/1980 | Wentworth, Jr. | 73/40 |
| 4,212,475 | 7/1980 | Sedy | 277/96.1 |
| 4,290,613 | 9/1981 | Scott | 277/96.1 |
| 4,420,970 | 12/1983 | Organi | 73/46 |
| 4,424,975 | 1/1984 | Langebrake | 277/81 R |
| 4,511,149 | 4/1985 | Wiese | 277/93 SD |
| 4,643,437 | 2/1987 | Salant et al. | 277/81 R |

Primary Examiner—Felix D. Gruber
Assistant Examiner—V. N. Trans
Attorney, Agent, or Firm—James J. Jennings

[57] ABSTRACT

An adaptive control system regulates operation of a mechanical seal assembly by reacting dynamically to changes in seal operating conditions to provide minimal wear with minimal fluid leakage. The disclosed "self-learning" method adapts automatically to arbitrary changes in fluid medium temperature and pressure, as well as shaft rotation speed, by detecting a limit cycle type oscillation of a seal-related variable, such as temperature of a seal face and/or fluid temperature. This variable is monitored via a microcomputer-based system which identifies these abrupt oscillations or spikes. The control algorithm selects a particular displacement of an actuator to modify the seal face deflection to the optimal value, and in this way attains maximum seal life while minimizing leakage.

24 Claims, 10 Drawing Figures

IN THIS STATE DIAGRAM, INCREASING VOLTAGE CORRESPONDS TO INCREASING FILM THICKNESS = INCREASING LEAKAGE = DECREASING WEAR

EACH ITERATION OF THIS FLOWCHART OCCURS EVERY ΔT SECONDS.

STARTUP MODE

SEARCH MODE

OPTIMIZATION MODE

MONITOR MODE

ERROR RECOVERY MODE

ADAPTIVE CONTROL SYSTEM FOR MECHANICAL SEAL ASSEMBLY

BACKGROUND OF THE INVENTION

The present invention includes a control system for regulating the relative positions of two seal members in a mechanical seal assembly to achieve optimum seal performance. The control system of the invention examines a predetermined parameter of the seal assembly when operating and, when a given phenomenon (signifying a reference position of the two seal faces) is detected through examination of that parameter, the relative positions of the seal members are adjusted for optimum seal performance.

A mechanical seal assembly is generally comprised of two separate seal faces, each of which has a smooth radial face surface opposed to a corresponding radial face surface of the other seal element. These two seal elements are spaced apart by a very minute distance, of the order of 50 to 200 microinches, to minimize leakage of a fluid under high pressure from a cavity within a fixed housing, past the opposed face surfaces into a low pressure space adjacent a shaft rotating in the housing. One of the seal elements is generally fixed to, or with respect to, the housing, and the other seal face is positioned adjacent, and biased toward, the fixed seal face by a spring, bellows, or other suitable member. The various operating conditions or parameters of the entire assembly change significantly as the system starts from rest, with the shaft not rotating, and is thereafter accelerated up to an operating condition where it might run for hundreds of hours before the system is again de-energized. Under such operation the parameters such as fluid temperature, pressure, angular speed of the shaft, thickness of the film (or gap between the seal faces), and viscosity or other characteristics of the fluid, may change. The fixed face can not move in the axial direction, parallel to the shaft, and the floating face (the one biased toward the fixed face) moves slightly in an attempt to accommodate the fluid dynamic and mechanical forces during system operation. While the seal faces appear very flat to the naked eye, when magnified thousands of times it is evident there are considerable asperities or irregularities on each surface. The thickness of the film in the gap (between faces) should exceed the roughness asperity height of the faces to prevent mechanical contact between the seal elements, but must not be too wide or excessive leakage will occur. The firm thickness for any one seal depends both on initial seal design (configuration, the materials from which the seal members are constructed, and so forth), and on the actual operating conditions (particularly fluid to be be sealed, shaft velocity, temperature and pressure). Accordingly, a seal assembly designed for one particular set of operating conditions may leak excessively or even fail due to mechanical contact after operating conditions are changed, such as by using a different fluid, changing the shaft speed, or changing some other condition.

For many mechanical seal assemblies, the film thickness (or gap width) is determined by the precise geometry of the opposed seal face surfaces. By way of example, if the two seal faces are perfectly flat and parallel each other, so that the gap between them is of a uniform width across the entire extent of the radial seal faces, a film cannot be maintained and it will collapse, allowing mechanical contact between the faces with resultant wear and possible destruction of the seal. In order to maintain a finite film thickness, it has been found that the gap between the adjacent faces must converge in the radial direction, going from the point farther from the shaft center (the high pressure side of the seal assembly) radially inwardly to the low pressure side, nearer the shaft axis. An alternate configuration could have the high pressure at the shaft and the low pressure at the outside diameter. In this case the adjacent faces must diverge in the radial direction, going from the point farther from the shaft center (low pressure side of the seal assembly) radially inwardly to the high pressure side nearer the shaft axis. Furthermore the greater the degree of convergence, the larger is the film thickness. Since the general practice has been to manufacture mechanical seal faces to be initially flat and parallel, such face convergence occurs (at least for commercially successful seal assemblies) as a result of thermal and mechanical deformations of the seal faces and other components of the seal assembly during operation. It should be noted that the required film thicknesses are so small that the corresponding necessary deformations are also very small, of the order of 20 to 100 microinches. Further once a conventional seal has been designed, built to specifications and then placed in service, the deformations under operating conditions (and hence the resultant film thickness) cannot be controlled or changed at will. Rather the deformation, and thus the ultimate film thickness, is determined not only by the original design and manufacture, but also by the subsequent operating conditions. A complete teaching of the best mode known for controlling convergence between adjacent seal faces is set out in another patent application entitled "Controllable Mechanical Seal", filed of even date, having Ser. No. 840,369 and assigned to the assignee of this application. The teaching of that copending application is hereby incorporated by reference in this application. That application issued Feb. 17, 1987 as U.S. Pat. No. 4,643,437.

In that Patent seal face convergence is controlled after sensing some parameter in the operation of the mechanical seal assembly. Such a parameter can be temperature, pressure, proximity of the seal faces, or some other useful information. Various attempts have been made to select and utilize different parameters, but no optimum system has been found to regulate the positions, much less the convergence, of the two adjacent seal faces under dynamic operating conditions.

It is therefore a primary consideration of the present invention to provide a control system for regulating the positions of the seal faces in a mechanical seal assembly, which system reacts dynamically to real time changes in the seal operating conditions and effects a regulation to provide not only minimal wear of the seal faces but also minimum leakage across the seal faces.

A more particular consideration is to produce an adaptive control system which incorporates a "self-learning" method to adapt automatically to arbitrary changes in fluid medium temperature or pressure, and to shaft rotation speed.

SUMMARY OF THE INVENTION

A control system constructed in accordance with the invention is especially useful with a mechanical seal assembly of the type including first and second seal faces, each having a face surface extending toward the face surface of the other seal element. One of the seal elements is movable toward and away from the other seal element to establish a gap for a fluid film between the seal face surfaces. Thus the term "film thickness", as used herein and in the appended claims, is equivalent to the gap defined between the opposed seal faces. An actuator means is provided to regulate the displacement of one seal face toward and away from the other seal face, to correspondingly regulate the film thickness. A sensor is coupled to one of the seal faces for providing a first signal which varies as a function of some parameter of the seal assembly.

The adaptive control system of the invention is coupled between the sensor means and the actuator means, for regulating the actuator means as a function of the received first signal. In accordance with the invention the adaptive control system is operable, in response to detecting the presence of a given phenomenon in the mechanical seal assembly, to identify a reference position of the movable seal face at which that phenomenon occurred, and thereafter to displace the movable seal face away from the fixed seal face to establish optimum seal performance.

A limit cycle oscillation occurs when one of the seal faces physically contacts the other. This limit cycle oscillation serves as the given phenomenon, in a preferred embodiment of the invention, which is detected to indicate that the undesired contact has occurred and to establish the reference position of the movable seal face. The control system then backs the movable seal face away in steps from the fixed seal face to approach an optimum film thickness, and the control system again regulates in a normal manner. Phenomena other than the limit cycle oscillation may be discovered, which phenomena can also be determined by examining some parameter, such as temperature, pressure, and so forth of the entire assembly. Such phenomena may serve in the same way that the limit cycle oscillation is utilized in the preferred embodiment of the present invention.

THE DRAWINGS

In the several figures of the drawings, like reference numerals identify like components, and in those drawings.

Figure 4A:
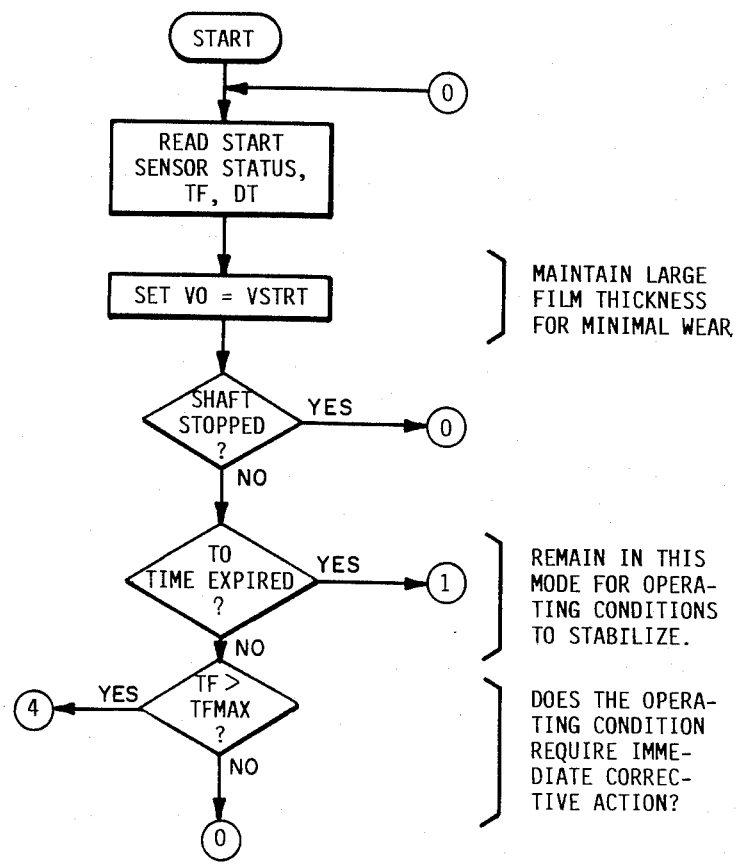
Figure 4B:
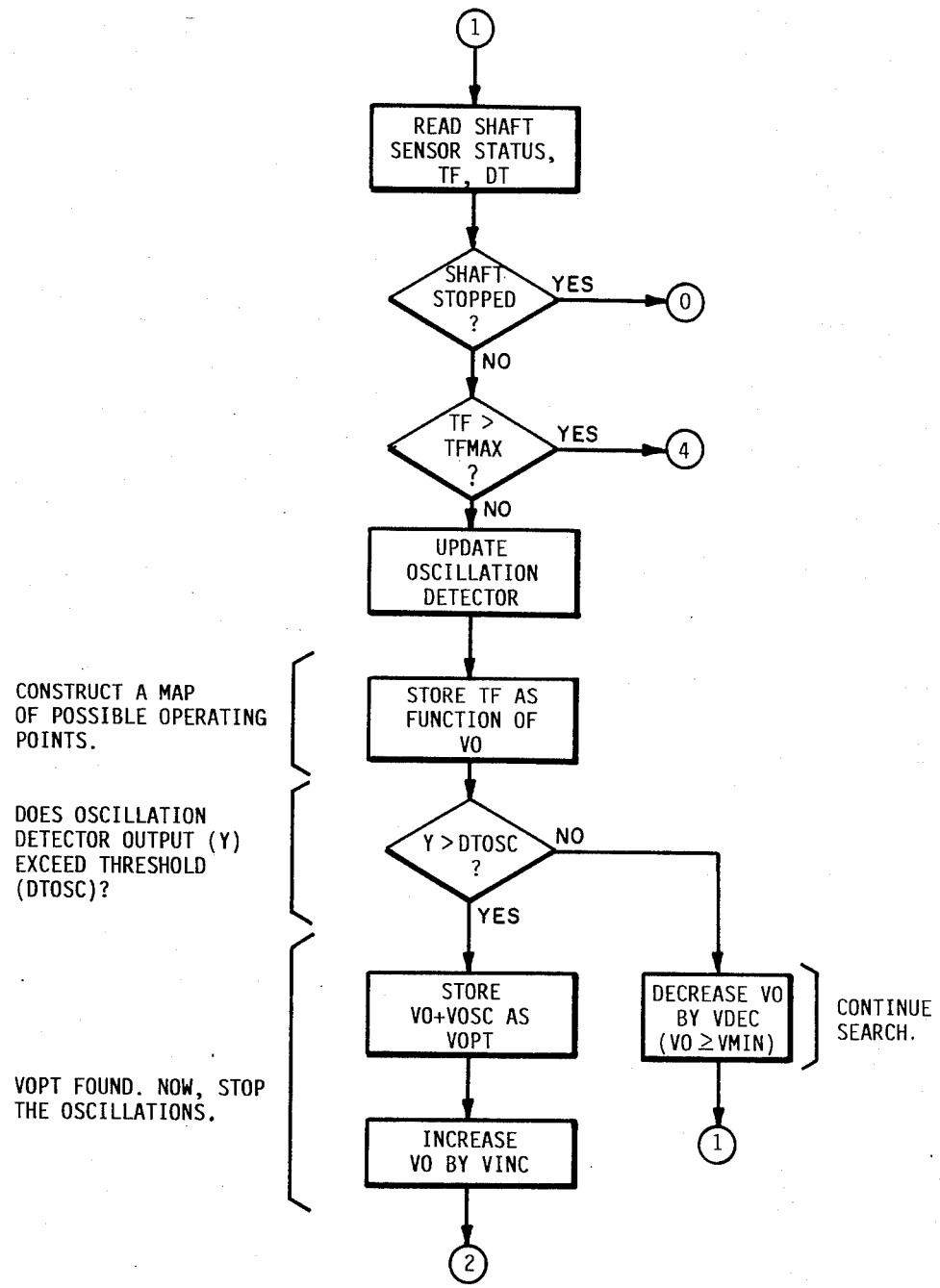
Figure 4C:
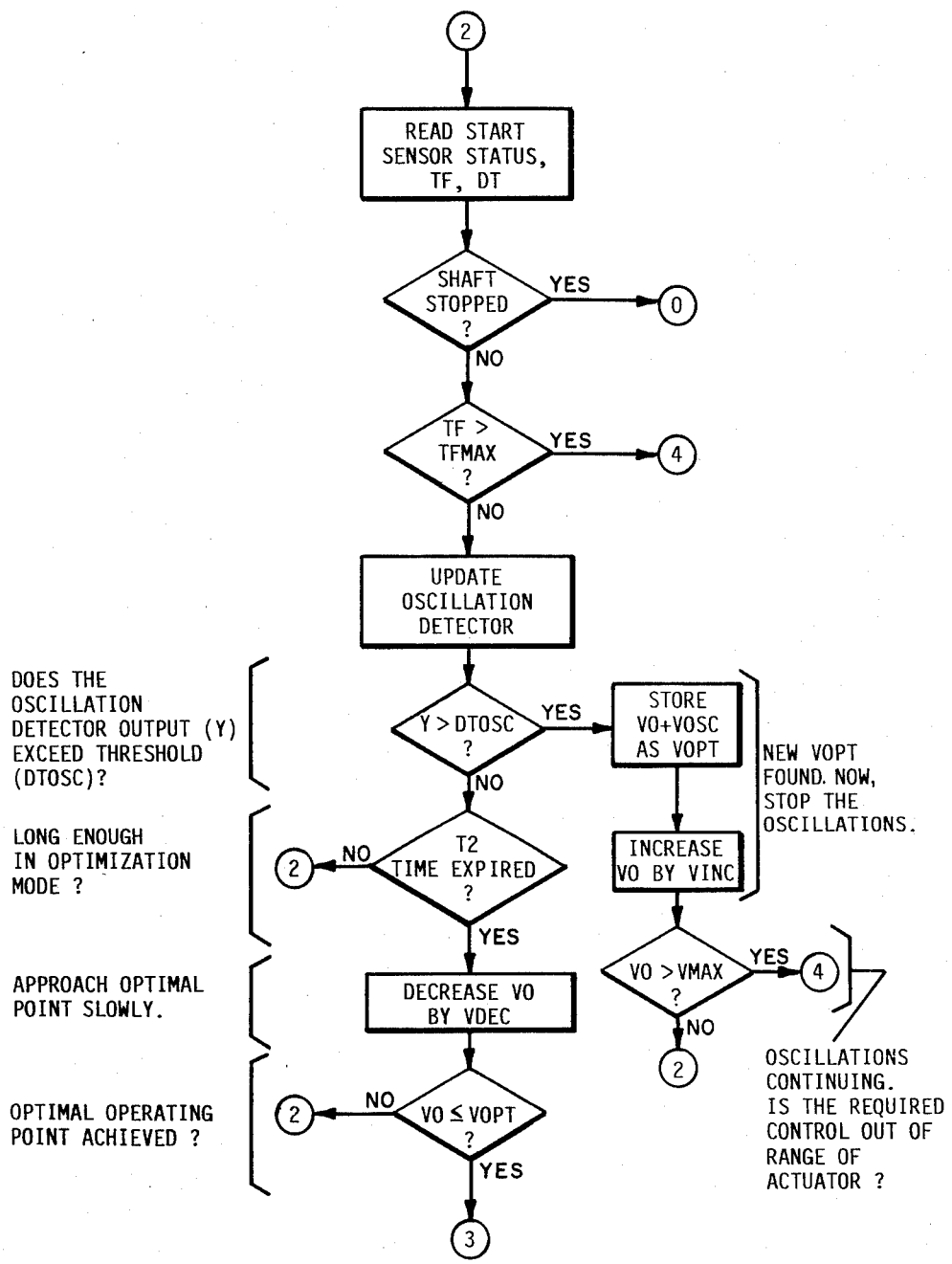
Figure 4D:
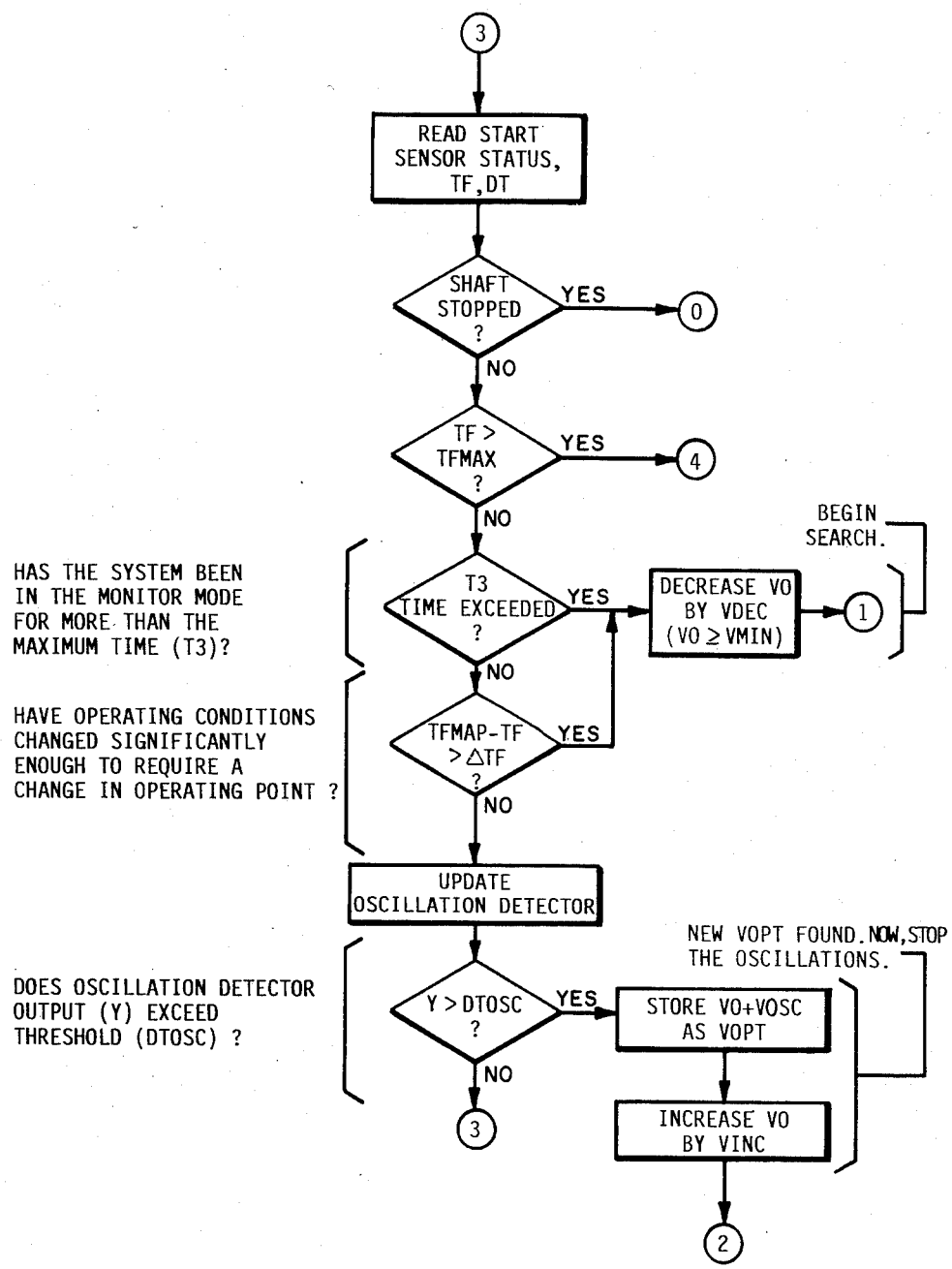
Figure 4E:
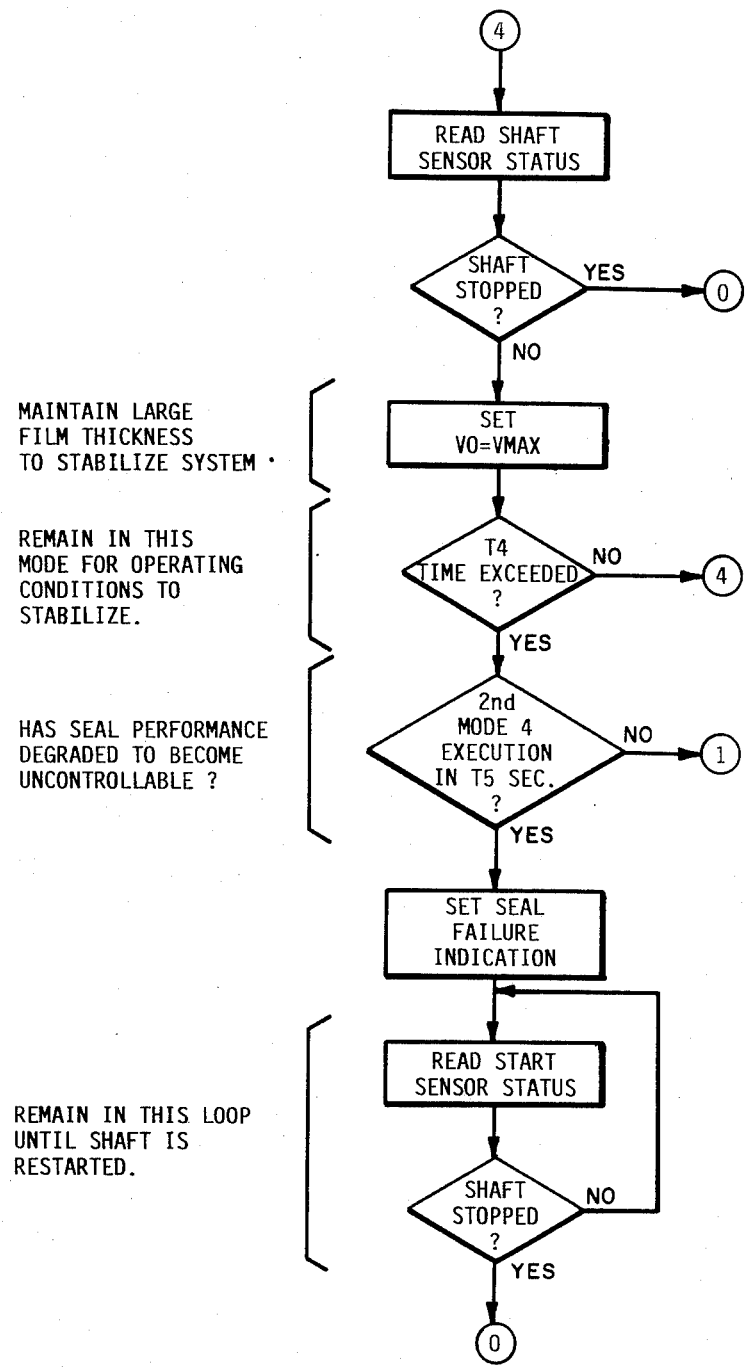
Figure 5:
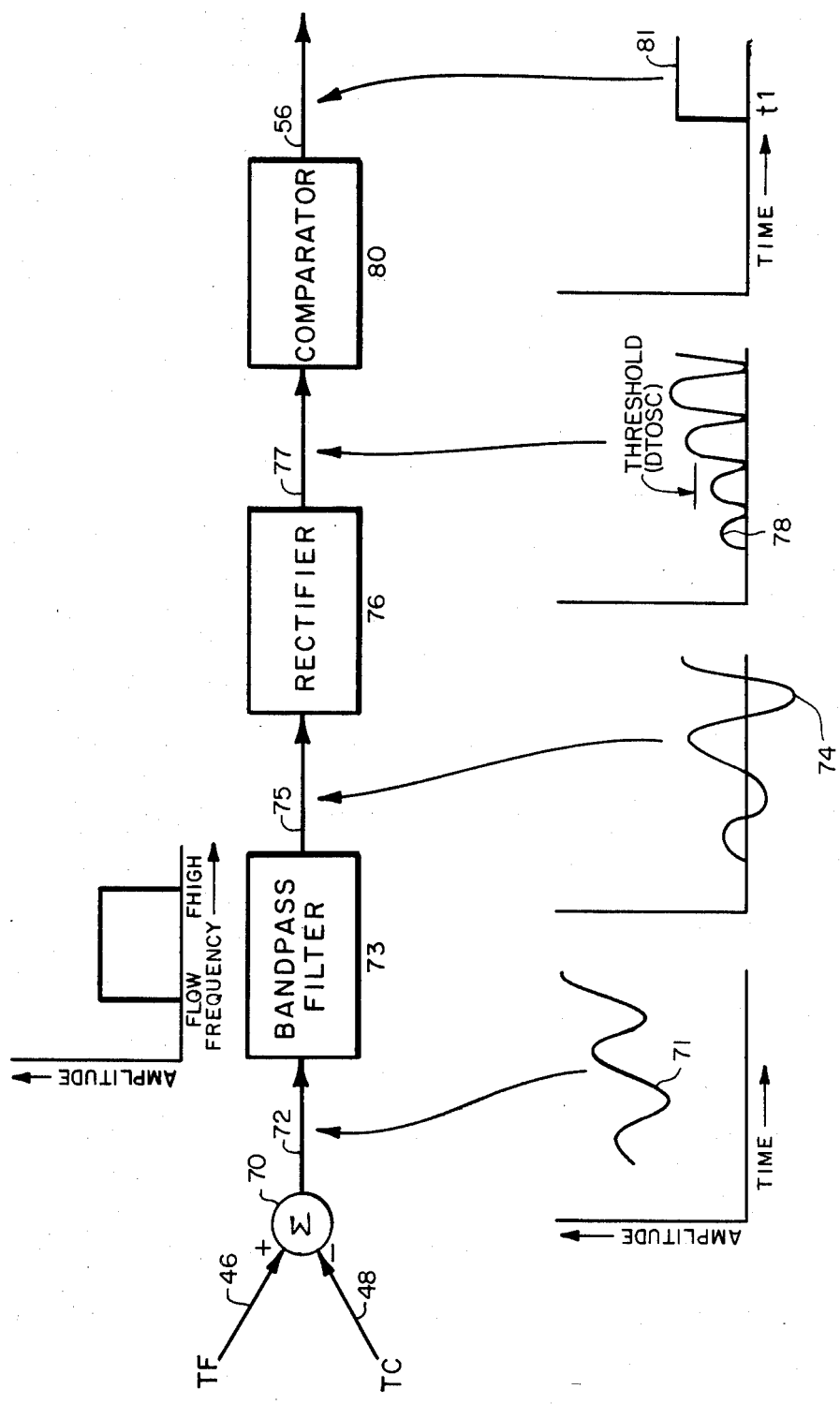

FIGS. 4A-4E together comprise a flow chart setting forth a control algorithm for practicing the invention; and FIG. 5 is a block diagram useful in understanding detection of a given phenomenon in accordance with the invention.

GENERAL SYSTEM DESCRIPTION

Figure 1:
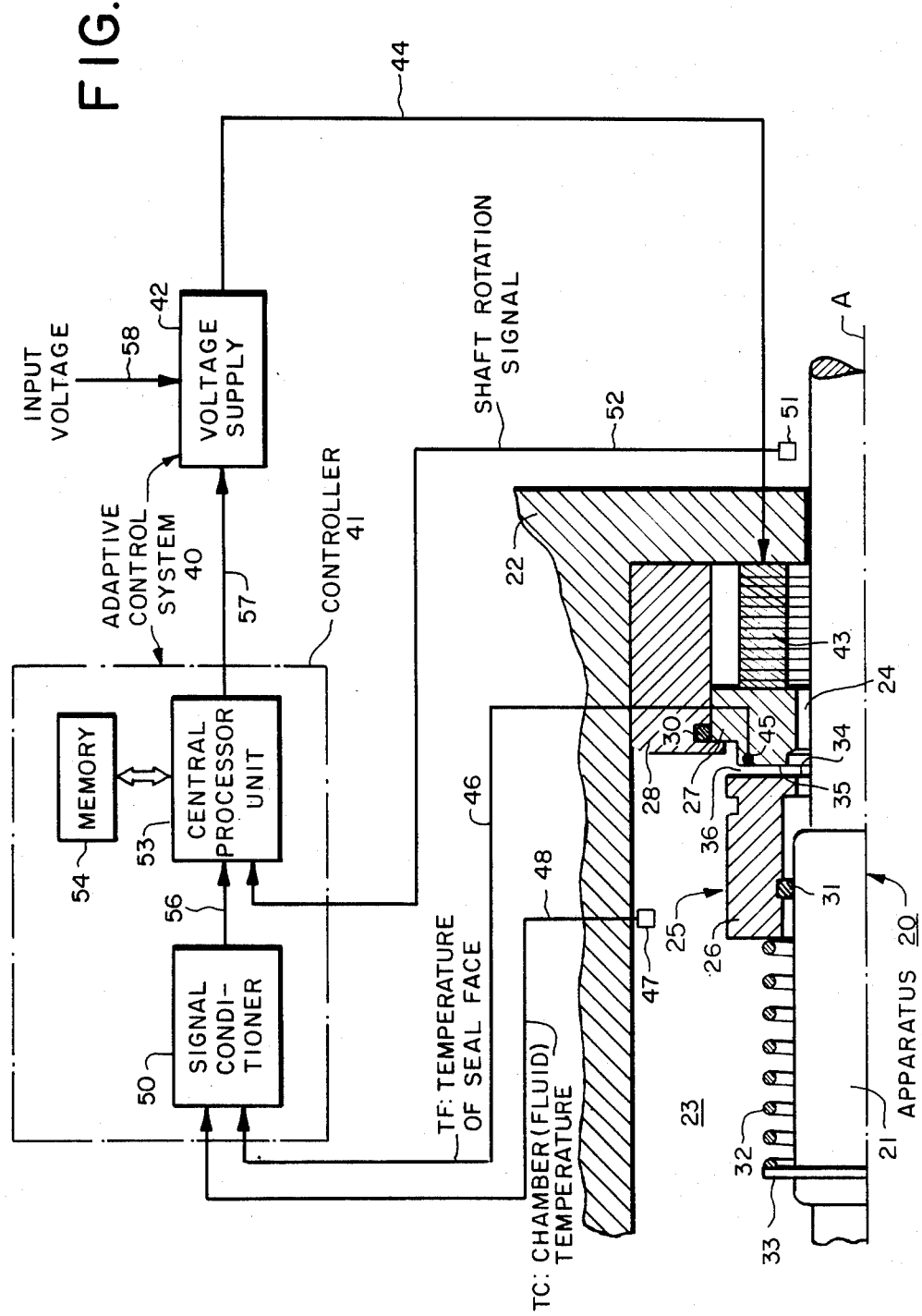
FIG. 1 is a simplified, sectional and block diagram showing of a mechanical seal assembly for regulation by the adaptive control system of the invention.

FIG. 1 shows a portion of a fluid-displacement apparatus 20 which includes a rotatable shaft 21, mounted for rotation along an axis A within housing 22 to displace a fluid from one point to another. The actual vanes or blades which move the fluid are not illustrated, because the structure and function of such vanes are well known and understood in this art. Fluid under pressure is constrained within a chamber 23, and it is prevented from leaking, at least from substantially leaking, to the low pressure area 24 by a mechanical seal assembly 25. The seal assembly includes a first face element 26 and a second face element 27. A mounting member 28 is provided to affix the second seal face 27 to housing 22, but for purposes of this explanation the term "mechanical seal assembly" includes the first and second face elements 26 and 27. Other components such as mounting member 28 are not considered a part of the mechanical seal assembly when that term is used in the appended claims. A first sealing member 30, which may be an O-ring, is positioned between mounting member 28 and seal face 27, and a similar type of conventional sealing unit 31 is located in a recess of seal face 26 in a position to abut shaft 21. Components 30, 31 are conventional and are not a part of the "mechanical seal assembly" as that term is used herein and in the appended claims. A bias element, shown as a simple spring 32, is positioned between a stop element 33 on shaft 21 and one end of seal face 26, to urge face 26 toward the other face element 27. The distance between the radial face surfaces 34 and 35 of the respective seal faces 26, 27 defines a gap 36. It is in this gap that the fluid film passes from the high pressure cavity 23 toward the low pressure volume 24, and some film must be present to afford lubrication between the radial face surfaces and prevent actual physical contact of the seals. Thus "film thickness" is equivalent to "gap width" or "gap".

Face element 26 is shown as rotatable with shaft 21, and movable axially, and face element 27 is shown as non-rotatable and axially fixed. However, it should be clearly understood that either element could be rotatable, with the other being non-rotatable, and either could be the floating (movable) element, with the other being fixed. Also, it should be understood that actuator 43 could be associated with either element, or could be an integral part of an element rather than a separate component. In the illustrated embodiment element 26 is both rotatable and floating, with element 27 non-rotatable and fixed. Actuator 43 is considered to be a separate component, associated with element 27. However in the terminology employed herein and in the appended claims seal face 27 is termed the movable or displaceable seal face.

In accordance with the present invention an adaptive control system 40 is provided for regulating the relative positions of seal faces 26, 27. Adaptive control system 40 includes a controller 41 and a voltage supply 42. An actuator means 43 is provided, and fixed between housing 22 and a portion of face element 27, to effect displacement of element 27 with respect to seal face 26, and thus modify the alignment of the faces with respect to each other, and correspondingly affect the distance of gap 36. In a preferred embodiment actuator means 43 was comprised of piezoelectric material, such as barium titanate. Such material functions as a transducer in a well known manner. That is, when a voltage is applied to such an actuator, one of its physical dimensions (such as the length) changes, effecting a corresponding movement of an element such as face element 27. Accordingly by regulating the amplitude of the voltage passed from voltage supply 42 over line 44 to actuator means 43, the position and/or alignment of face element 27 can be modified as explained in the above-identified patent, and likewise the extent of gap 36 is regulated. Hence face element 27 is considered movable, as a function of controlled displacement by actuator 43. To provide input information to adaptive control system 40, a sensor means 45 is provided in seal element 27, near its radial face surface 35. In the preferred embodiment this sensor was a thermocouple, to provide an indication of the temperature adjacent the face of this component. This temperature information was translated as an electrical signal over line 46 to one input of adaptive control system 40. Because the thermocouple 45 is very close to the surface of face seal 27, the temperature information on line 46 is termed the seal face temperature. This signal on line 46 can itself serve as a first signal which varies as a function of a given parameter of the seal assembly—in this case, the given parameter is the temperature of the seal face. Another thermocouple 47 is positioned in chamber 23 to provide over line 48 a second signal, related to the temperature of the fluid in chamber 23. In a preferred embodiment of the invention, signal conditioner stage 50 at the input side of controller 41 receives both the chamber temperature signal TC and the seal face temperature signal TF, and algebraically combines the two signals to provide a differential temperature signal (DT) which then serves as the first signal from which the given phenomenon can be detected. In addition use of this arrangement provides a qualitative measurement of deviation from an optimum system operating point. For example, a low differential temperature signal indicates excessive leakage across the gap, whereas a high value of the differential temperature signal signifies too little film thickness, or even excessive wear of the seal faces. For this reason it is preferred to use the differential temperature signal, as will be explained more fully in connection with FIG. 5, rather than only the temperature of the seal face to provide the information-bearing signal to controller 41.

The invention operates, after detecting occurrence of a given phenomenon at some location in the mechanical seal assembly, to provide an output signal over line 44 which, through actuator 43, displaces face element 27 away from the other face element 26 until that detected phenomenon is no longer present. The phenomenon of interest is a limit cycle oscillation, a particular vibration or rapid cyclical movement of one or more components in the assembly when some condition occurs. A limit cycle oscillation may be understood in connection with known electronic components, such as a conventional oscillator. With a given power supply, and fixed components such as inductances and capacitors, when an oscillator is energized it provides an alternating output signal at an amplitude and frequency determined by the limitations just described. In the same way when some undesired operation, such as a physical touching of the radial face surfaces of the two face elements 26, 27 occurs, then there is an analogous vibration in the various mechanical seal parameters which is manifested as a fluctuation in the temperature, pressure adjacent the gap, physical positions of the seal components, and so forth. When the film thickness is sufficiently large to allow normal operation of the system without any contact between the seal faces, there is no limit cycle oscillation. Hence the limit cycle oscillation serves as the phenomenon of interest to be detected by examining a particular parameter—in this case, the temperature differential between the seal face and the fluid in the chamber—of the entire mechanical seal assembly when it is operating. Those skilled in the art will appreciate that other parameters may be examined for an indication of occurrence of a given phenomenon.

Another sensor 51 is positioned adjacent shaft 21 in a position to provide an electrical signal, over line 52, to central processor unit 53 in controller 41 whenever shaft 21 moves from an at-rest position and begins rotation. Such shaft rotation sensors are well known and understood. It is also apparent that although a single conductor is shown as the lines 46, 48 and 52, in general a pair of conductors are utilized to pass these electrical signals. There may be in fact one electrical conductor where the housing and other components of the system are used as a second, or ground return, conductor but only one line is shown for simplicity of explanation.

Controller 41 also comprises a memory unit 54 intercoupled with central processor unit (CPU) 53. Those skilled in the art will recognize the basic configuration of a computer or microcomputer with the stages 53 and 54. The basic input signals to the CPU are a first signal received over line 56 from signal conditioner 50, which signal essentially "tells" the CPU whether a limit cycle oscillation has occurred or is occurring. In addition signal conditioner stage 50 passes the temperature signals received on lines 46 and 48 directly to the CPU. The other input signal on line 52 informs the CPU whether shaft 21 is rotating or is at rest. The output signal from CPU 53, and thus from controller 41, is passed over line 57 to voltage supply 42. This supply also receives an input voltage over line 58. The voltage supply adjusts the amplitude of the output voltage on line 44 as a function of the signal on line 57, and passes the output voltage over line 44 to actuator 43. Such circuit arrangements are well-known and understood and will not be described further.

The temperature in element 27 adjacent the gap was selected as the parameter of interest because this is the most direct and least expensive variable to measure at this time. The temperature of the fluid in chamber 23 is likewise easy to measure. Other parameters such as heat flow, seal frictional force, deflection of the seal face, and leakage through the gap are difficult to measure. Direct measurement of the torque with a transducer is possible but not very practical in an operational environment. Thus it is important to realize that other parameters can in fact be sensed to determine the phenomenon under examination, the limit-cycle oscillation, as such an oscillation is manifested throughout the system in all these other variables. When a limit-cycle oscillation occurs it indicates that the gap has been reduced to a distance less than 20 microinches, indicating that the two seal faces have probably touched to raise the temperature sensed by thermocouple 45.

DETAILED DESCRIPTION OF THE INVENTION

Figure 2:
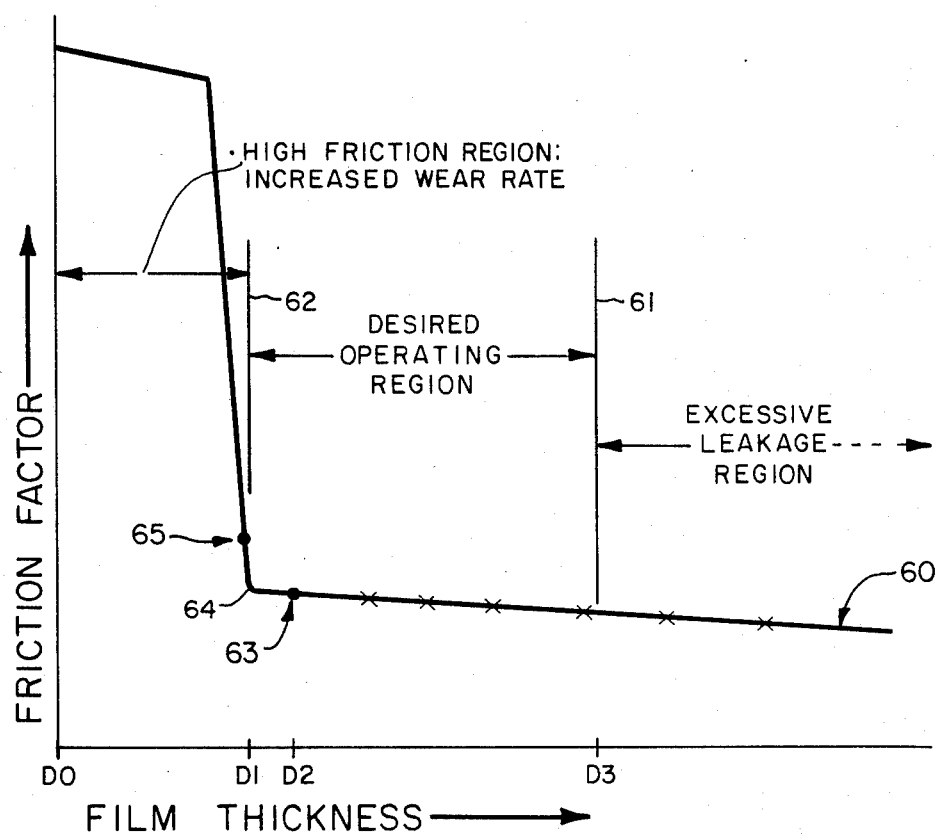
FIGS. 2 and 6 are graphical illustrations useful in understanding mechanical seal operating conditions.

Before considering the control strategy of the present invention in detail, an overall perspective may be had from considering the showing of FIG. 2. In that figure the abcissa scale indicates the extent of gap 36, or the film thickness, between the adjacent radial seal faces 34, 35. The ordinate scale is a measure of the friction factor, that is, the friction developed between the seal faces. Curve 60, which is actually comprised of three straight segments, indicates the relationship between the friction factor and the gap between the seal faces. The area is basically divided into three regions by the vertical lines 61 and 62. To the right of line 61 is an area identifying the region in which excessive leakage occurs when the gap between the seal faces is too large; on the abcissa this occurs to the right of D3. As the extent of the gap between seal faces is reduced, the area between lines 61 and 62, represents a desired operating region for the seal. This is between points D1 and D3 on the scale. If the gap is narrowed too much, into the region to the left of line 62, a very high friction factor and thus a high wear rate of the seal components, and instability, are produced. With a large gap, the other extreme is provided in the excessive leakage region, and the desirable operating region is between these two extremes, between D1 and D3 on the gap scale.

The invention is particularly concerned with regulation to achieve an optimum operating point, that designated 63. This is achieved by starting up the system with a wide gap between the seal faces, so that the system is operating in the excessive leakage region. The gap is then gradually decreased in increments as represented by the small x's along curve 60, and actually going past the ideal point 63, past the first break point 64 to point 65 on curve 60. When the gap decreases below the width corresponding to D1 on the scale and the film thickness is that corresponding to point 65, a limit cycle oscillation occurs and is detected by the system. In accordance with the inventive teaching the gap is then increased by the amount represented between D1 and D2, so that the system is operating at point 63. It is emphasized that the ideal point was actually reached by going too far, beyond point 64, and then backing down curve 60 to an appropriate operating point. This is possible because the limit cycle oscillation gives a very good indication of the break point 64, identifying the region of unstable operation and increased wear rate.

Memory array 54 (FIG. 1) is used to store temperature information related to the film thickness values represented by the small x's on curve 60. This could also be accomplished by storing the voltage commands passed over line 44 to actuator 43 as the film thickness is gradually decreased after startup. Thus the curve 60 is actually developed and the values stored each time the system is energized. Accordingly the adaptive control system of the invention compensates for variables such as wear of the seal faces, changes in the fluid being pumped, pressure and temperature changes, and so forth. Each startup is a new self-learning experience and the system moves in small increments, denoted by the x's, to "learn" where the limit cycle oscillation occurs and thus identify a reference location, which corresponds to break point 64. Upon detecting a limit cycle oscillation the film thickness is initially increased by an increment larger than the last amount of film thickness decrease, to insure the system is operating in a stable region. Thereafter the film thickness can again be decreased in small amounts to be sure that the film thickness, and thus the fluid leakage, is not excessive.

In accordance with another important aspect of the invention, the system is regulated so that at startup, the system is operated in the excessive leakage region for a predetermined time period. This allows the system to come up to speed and reach desired operating temperatures, and then the algorithm begins the displacement of the movable seal face so that the point 64 is first reached and then the system is backed off to provide the gap represented by point 63. This prevents damage or excess wear which might otherwise occur during the startup interval.

Figure 3:
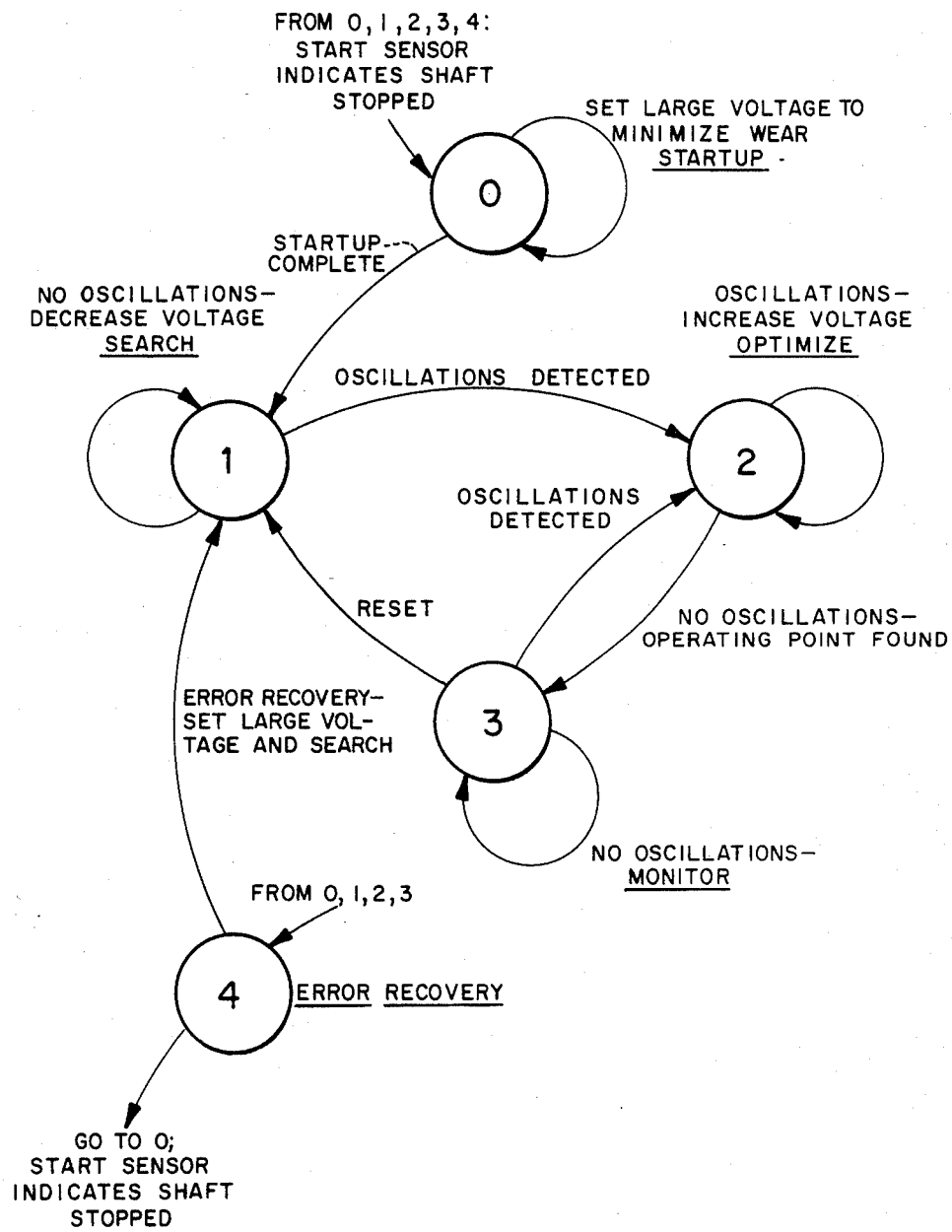
FIG. 3 is a state diagram of a control algorithm useful in implementing a preferred embodiment of the invention.

In FIG. 3 the general state diagram for the control algorithm is set out. Whenever the legend indicates that the voltage has increased, this corresponds to an increase in the gap distance to increase the film thickness. The five circles, with the numerals 0 to 4 in each of the circles, identify the particular operating state or mode of the system at a given time.

By way of example, when the system is started, the startup mode indicated by 0 is entered. This mode can be entered from any of the others when the system is shut down and then restarted, when the signal from the start sensor 51 is provided to the adaptive control system as previously explained. Under these conditions the large voltage is set to provide a sufficiently wide gap so that there is minimum wear on the system during the startup interval. After the startup interval has been completed the startup mode operation is complete, and the system goes to mode 1, designated in the search mode.

In this mode the voltage to actuator 43 is decreased in steps, as represented by the movement from x to successive x along curve 60 in FIG. 2. While no limit cycle oscillations are detected, this operation in the search mode continues.

When the film thickness decreases below that represented by break point 64 and a limit cycle oscillation is detected, the system goes to mode 2, that of optimizing the system operation. In this mode the voltage applied to actuator 43 is increased in steps, to correspondingly increase the width of the gap, until no oscillations are detected. At this time the appropriate operating point has been found, and the system enters mode 3, that of monitoring operation of four functions: (1) shaft rotation; (2) large changes in seal face temperature; (3) whether the seal face temperature exceeds a danger limit; and (4) presence of limit cycle oscillations.

After the system has stabilized, it again goes to mode 1 and searches to determine that the operating point 63 is not too far to the right of break point 64 in the desired operating region. That is, the system decreases the actuator voltage slightly and then determines whether a limit cycle oscillation has occurred; if it has not, the system has found a new optimum operating point 63.

Mode 4 is the error recovery mode, and this can be entered from any of the previously described modes when the seal face temperature indication derived from the thermocouple is above a preset maximum value. This indicates that a limit cycle oscillation has occurred; a large voltage command is then set to open the gap and the system goes back to the startup mode, described previously as mode 0. With this perspective of the overall system the subsequent operation in connection with the detailed flow chart will be more readily comprehended.

To enable those skilled in the art to practice the invention with a minimum of experimentation, a complete algorithm for regulating system operation from startup through error recovery is set out in FIGS. 4A–4E. Each separate mode or state of the system is depicted on a separate page of the drawings, and the legends used have the following meanings:

| LEGEND | MEANING |
|---|---|
| VOSC | Constant voltage to which the optimal operating point is set above the output voltage where the oscillation first occurs. This insures that any reasonably small variation in operating conditions will not cause oscillations. |
| VMIN | Minimum actuator voltage command |
| VMAX | Maximum actuator voltage command |
| VINC | Step increase interval of actuator voltage to cease oscillation (VINC >> VDEC) |
| VDEC | Step decrease interval of actuator voltage for oscillation search (VDEC << VINC) |
| VSTRT | Initial actuator voltage during startup and search modes (VSTRT <= VMAX) |

| LEGEND | MEANING |
| --- | --- |
| TFMAX | Maximum tolerable seal face temperature |
| ΔTF | Maximum permitted temperature deviation from mapped face temperature (TFMAP − TF < ΔTF) |
| TFMAP | Mapped seal face temperature at optimal operating point |
| T | Computer sampling interval |
| T0 | Time in startup mode 0 |
| T2 | Minimum time in optimization mode 2 to obtain stable operation |
| T3 | Maximum time in monitor mode 3 before entering the search mode |
| T4 | Minimum time in error recovery mode 4 before entering the search mode |
| T5 | Time in which if two mode 4 executions occur, no further active control occurs until the shaft is stopped and restarted. |
| DTOSC | Minimum magnitude of temperature difference for confirmation of limit cycle oscillation |
| FLOW | Minimum frequency of oscillation detection |
| FHIGH | Maximum frequency of oscillation detection |
| TF | Seal face temperature |
| TC | Chamber temperature |
| DT | Temperature differential between the seal face and chamber - input to oscillation detector |
| Y | Output of oscillation detector |
| VO | Output voltage to actuator |
| VOPT | Optimal operating point |

With this set of explanations for the legends, the algorithm is self-explanatory.

In FIG. 4B, just below the center of the search mode section of the algorithm, there is an operations box designated "STORE TF AS FUNCTION OF VO". This means that curve 60 in FIG. 2 is being developed and stored by assigning values to designate the little x's on curve 60. Each value is indicated by the temperature of seal face 35, provided on line 46, as a function of the voltage command VO on line 44 at that same instant. In this way curve 60 is generated and stored for future use in system operation.

FIG. 5 is a generalized showing of a circuit for accomplishing the function of signal conditioner stage 50 shown as a single block in FIG. 1. The seal face temperature signal on line 46 and the chamber fluid temperature signal on line 48, as shown in FIG. 1, have the same reference numerals in FIG. 5. These two signals, TF and TC, are applied to a summation stage 70, which algebraically combines the signals and passes the resultant signal 71, DT, over line 72 to a bandpass filter 73. The characteristic of this filter is shown generally above it, and it passes the band of frequencies between FLOW and FHIGH, up to a preset amplitude. The output of filter 73, depicted by curve 74, is passed over line 75 to a rectifier stage 76. In this stage the conventional rectification takes place to provide on line 77 a signal like that designated 78. The threshold or DTOSC level is that already described as the minimum magnitude oscillation in the signal under examination to confirm the presence of a limit cycle oscillation. This signal is passed to a comparator 80, the output of which is applied over line 56 to CPU 53 (FIG. 1). This signal is represented by 81, and is shown going high at time t1. That is, when the signal from rectifier 76 exceeds the threshold value DTOSC, the output of comparator 80 switches to confirm to the CPU that a limit cycle oscillation has been detected. Those skilled in the art will appreciate that other circuits for conditioning the system signals can readily be implemented to examine any appropriate variable for the occurence of a given phenomenon. Moreover the implementation of the functions depicted in FIG. 5 can be accomplished in software as well as in hardware.

Figure 6:
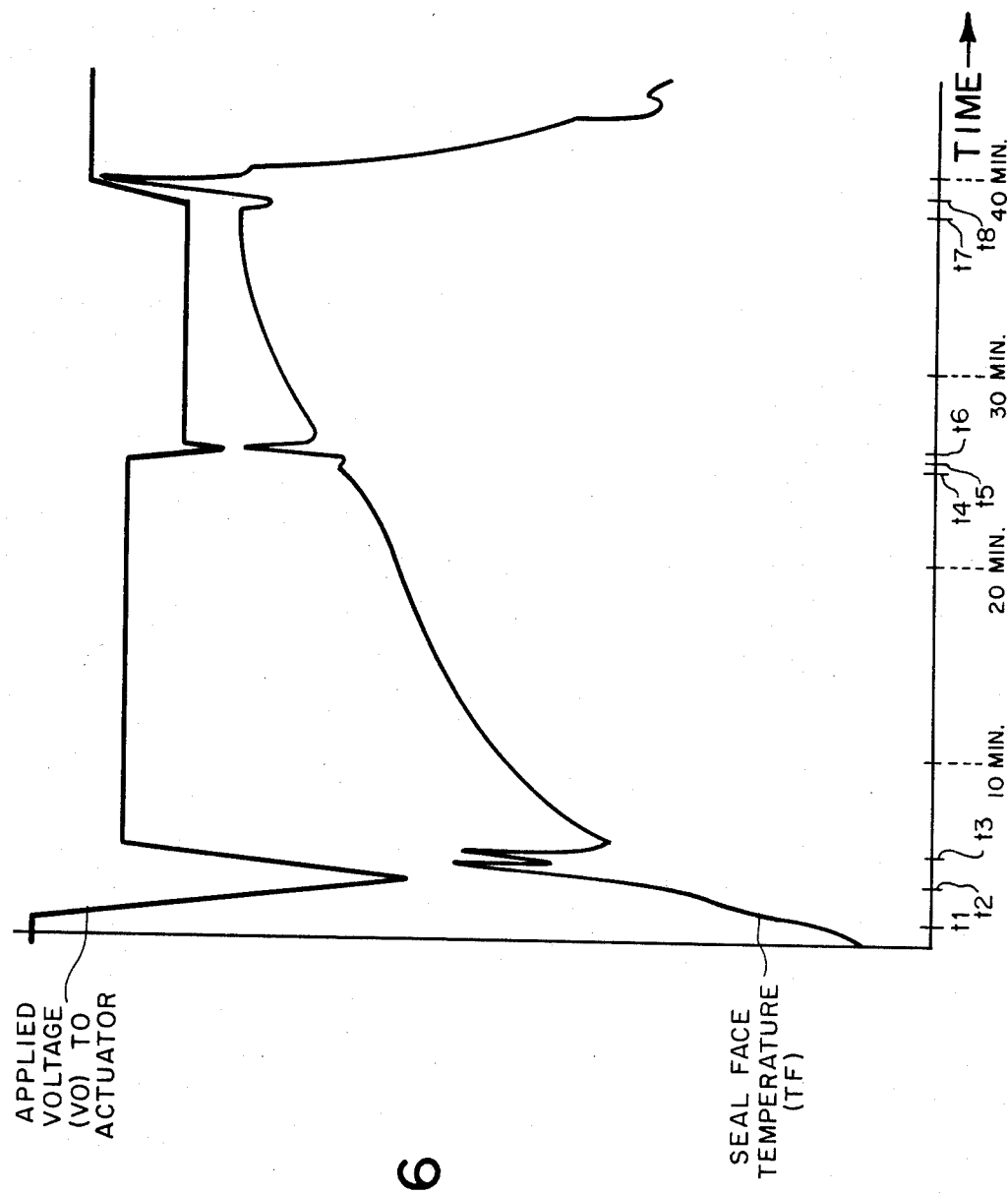

FIG. 6 depicts actual test results obtained from recording the seal face temperature TF and the actuator applied voltage VO as a function of time. As noted previously, this is the information used to determine the curve 60 portrayed in FIG. 2. The test results shown in FIG. 6 were obtained over an operating interval of about 45 minutes. At the beginning of the time shown in FIG. 6, the applied voltage signal to actuator 43 is high, as it is in the startup mode, and thus there is a large amplitude film thickness or high leakage, resulting in a low temperature in the seal face. The system is in the startup mode.

At time t1 the system enters the search mode 1. The voltage to the actuator is gradually decreased, until time t2. It is at this instant that the limit cycle oscillation is detected by the adaptive control system, and this is manifested in the sharp increase in the seal face temperature after this instant thus the system enters the optimize mode. Between times t2 and t3, in mode 2 the voltage command is gradually increased in increments until the output of signal conditioner 50 goes low, indicating there is no longer any limit cycle oscillation. The operating point has been found, and the monitor mode 3 is entered. The temperature of the seal face rapidly drops, and then gradually increases at a much slower rate because the fluid temperature has been gradually increased from time t1. The system remains in the monitor mode 3 until time t4.

At time t4 the system recognizes that a considerable temperature increase has occurred, and that conditions may not be at the optimal operating point. Accordingly the system returns to the search mode 1, to determine if the film thickness is excessive. The voltage VO is again decreased between times t4 and t5, until a limit cycle oscillation is detected as evidenced by the corresponding increase in seal face temperature at time t5, and the system returns to optimize mode 2. Between times t5 and t6 the voltage signal is increased until the output of the signal conditioner again goes low, denoting the absence of any limit cycle oscillation. The system remained in this stable operating condition, in monitor mode 3, between times t6 and t7.

At time t7 the seal face temperature starts to decrease, but at this time a pressure increase was introduced into the fluid adjacent the seal assembly. This results in the production of a limit cycle oscillation and a rapid increase in the seal face temperature. As shown the system again increases the voltage applied to the actuator to increase the film thickness, accommodating the increased pressure. This was accomplished in the optimize mode 2, and after time t8 the system has stabilized with the new increased film thickness, so the system returns to the monitor mode 3. Thus no matter the disturbance introduced into the seal assembly, the control system of this invention always adapts to the changed conditions, establishing a new optimal film thickness which produces long seal life and minimum leakage.

TECHNICAL ADVANTAGES

The system of the invention is truly adaptive because it establishes a new operating curve, shown as curve 60 in FIG. 2, every time the system is energized. Thus if the seal faces have worn, if there is a difference in the heat flow, if system torque has changed, or the leakage or deflection of the seal faces has changed, the system of the invention always comes to the optimum operating point to produce the optimum film thickness under real time operating conditions. Both wear and leakage are minimized for all operating conditions. This has been accomplished by utilizing a given physical phenomenon—here a limit cycle oscillation—to establish a reference point, the break point 64 in curve 60, and thus "find" the optimum operating point just to the right of this break in the curve.

While the movable seal face depicted and described in connection with the invention is a unitary seal face, those skilled in the art will appreciate that the adaptive control system of the invention can also be applied to regulate a movable seal face which includes more than one component. For example the movable seal face can include a first component fixed, directly or indirectly, to the stationary housing, and a second component movable by the actuator. In such an arrangement movement of the second component is effective to change the gap between the seal faces, thus adjusting the film thickness.

Sensor 51 has been shown adjacent shaft 21 to provide a signal indicating rotation and non-rotation of the shaft. Those skilled in the art will recognize that the sensor arrangement can also provide additional information, such as a change in the angular velocity of the shaft beyond a preset range, and/or an actual shaft speed indication.

In the appended claims the term "connected" (when used in an electrical or electronic sense) means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. An adaptive control system for a mechanical seal assembly of the type including first and second seal faces, one of the seal faces being movable toward and away from the other seal face to regulate a gap, and thus adjust a film thickness, between the respective seal faces, actuator means for regulating the displacement of the movable seal face to adjust the film thickness, and sensor means connected to provide a first signal which varies as a function of a given parameter of the seal assembly, said control system being coupled to the sensor means and to the actuator means, for regulating the actuator means as a function of the received first signal, characterized in that the control system is operable, in response to identifying the presence of a given phenomenon in the mechanical seal assembly, to identify a reference position of the movable seal face, and thereafter to displace the movable seal face away from the other seal face to establish optimum seal performance.

2. An adaptive control system as claimed in claim 1, in which said given phenomenon is a limit cycle oscillation.

3. An adaptive control system as claimed in claim 2, in which the given parameter is the temperature of one of said seal faces.

4. An adaptive control system as claimed in claim 2, in which a housing is provided to contain fluid adjacent the seal faces, in which the given parameter is the difference between the temperature of said fluid and the temperature of one of said seal faces.

5. An adaptive control system as claimed in claim 3, in which the sensor means includes at least one thermocouple.

6. An adaptive control system as claimed in claim 5, in which said one thermocouple is positioned to sense the temperature of said one seal face, and in which the sensor means further comprises a second thermocouple, positioned to sense the temperature of said fluid.

7. An adaptive control system as claimed in claim 2, and further comprising means for regulating the film thickness when operation of the mechanical seal assembly is begun by initially providing a film thickness significantly greater than the normal film thickness, and maintaining the greater film thickness for a predetermined minimum time period.

8. An adaptive control system as claimed in claim 7, including a driving shaft which is rotated when seal assembly operation is begun, and means is provided to supply the adaptive control system with a signal related to the rotational speed of the driving shaft.

9. An adaptive control system as claimed in claim 8, in which said signal is utilized to determine whether the shaft is stopped or rotating.

10. An adaptive control system as claimed in claim 2, and further comprising a processor unit and a memory, and a control program stored in the memory for regulating operation of the seal assembly at startup to effect a larger than normal film thickness upon startup, thereafter decreasing the film thickness in increments of given extent until the limit cycle oscillation is detected, and then increasing the film thickness by an extent greater than the last decrease in film thickness just prior to detection of the limit cycle oscillation.

11. An adaptive control system as claimed in claim 10, in which data denoting the incremental decreases in film thickness is stored in the memory and, upon detection of the limit cycle oscillation, the stored data is utilized to increase the film thickness to an appropriate value.

12. An adaptive control system for a mechanical seal assembly of the type including first and second seal faces, a housing for containing fluid adjacent the seal faces, one of the seal faces being movable toward and away from the other seal face to regulate a gap, and thus adjust a film thickness, between the respective seal faces, an actuator connected to regulate displacement of the movable seal face to adjust the film thickness, a first sensor positioned to provide a first signal which varies as a function of the temperature of one of the seal faces, a second sensor positioned to provide a second signal which varies as a function of the fluid temperature, said control system being coupled to both sensors and to the actuator, and a signal conditioner circuit in the control system connected to receive the first and second signals and provide a resultant signal which varies as a function of the temperature difference between the fluid and the seal face in which the first sensor is positioned, for regulating the actuator as a function of said temperature difference, the control system being operable, in response to identifying the presence of a limit cycle oscillation on the resultant signal, to identify a reference position of the movable seal face, and thereafter to displace the movable seal face away from the reference position and from the other seal face to establish a film thickness at which a limit cycle oscillation is not present.

13. An adaptive control system as claimed in claim 12, and further comprising means for regulating the film thickness when operation of the mechanical seal assembly is begun by initially providing a film thickness significantly greater than the normal film thickness, and maintaining the greater film thickness for a predetermined minimum time period.

14. An adaptive control system as claimed in claim 12, including a driving shaft which is rotated when seal assembly operation is begun, and means is provided to supply the adaptive control system with an indication that rotation of the driving shaft has commenced.

15. An adaptive control system as claimed in claim 12, and further comprising a processor unit and a memory, and a control program stored in the memory for regulating operation of the seal assembly at startup to effect a larger than normal film thickness upon startup, thereafter decreasing the film thickness in increments of given extent until the limit cycle oscillation is detected, and then increasing the film thickness by an extent greater than the last decrease in film thickness just prior to detection of the limit cycle oscillation.

16. An adaptive control system as claimed in claim 15, in which data denoting the incremental decreases in film thickness is stored in the memory and, upon detection of the limit cycle oscillation, the stored data is utilized to increase the film thickness to an appropriate value.

17. The method of controlling a mechanical seal assembly having two faces, one face being displaceable with respect to the other face to adjust the gap and thus regulate the thickness of a film defined between the faces, comprising the steps of:
   initiating seal assembly operation with a given film thickness greater than an optimum film thickness;
   gradually decreasing the film thickness;
   examining a parameter of the seal assembly for an indication of a given phenomenon; and
   upon recognizing that the phenomenon has occurred, increasing the film thickness until the phenomenon is no longer present, thus providing seal assembly operation at an optimum film thickness.

18. The method of controlling a mechanical seal assembly set out in claim 17, in which upon startup, the given film thickness is maintained for a predetermined minimum time, prior to any decrease of the film thickness.

19. The method of controlling a mechanical seal assembly as set out in claim 17, and further comprising mapping the gradual decrease in film thickness after startup by storing a series of data connoting the successive decreases in the film thickness, storing a reference data value identifying the film thickness at which the given phenomenon occurred, and using both the reference data value and the series of data in effecting the increase of the film thickness to approach the optimum film thickness.

20. The method of using a data processor with a memory array in controlling a mechanical seal assembly having two faces and fluid adjacent the faces, one face being displaceable with respect to the other face to adjust the gap and thus regulate the film thickness of the fluid between the faces, comprising the steps of:
   initiating seal assembly operation with a given film thickness which produces excessive leakage;
   sensing the temperature of one face to provide a first signal which varies as a function of the face temperature;
   examining the first signal for an indication of a limit cycle oscillation; and
   upon recognizing that a limit cycle oscillation has occurred, increasing the film thickness by a predetermined amount, thus providing seal assembly operation at an optimum film thickness.

21. The method of controlling a mechanical seal assembly set out in claim 20, and further comprising the steps of sensing the fluid temperature to provide a second signal which varies as a function of the fluid temperature, algebraically combining the first and second signals to produce a resultant signal, and examining the resultant signal for an indication of a limit cycle oscillation.

22. The method of controlling a mechanical seal assembly as set out in claim 20, in which upon initiation of seal assembly operation, the given film thickness is maintained for a predetermined minimum time, prior to any decrease of the film thickness.

23. The method of controlling a mechanical seal assembly as set out in claim 20, and further comprising mapping the changes in film thickness by storing a series of data connoting successive changes in the film thickness, storing a reference data value identifying the film thickness at which the limit cycle oscillation occurred, and using both the reference data value and the series of data in effecting the increase of the film thickness toward the optimum film thickness.

24. The method of using a data processor with a memory array in controlling a mechanical seal assembly having two faces and fluid adjacent the faces, one face being displaceable with respect to the other face to adjust the gap and thus regulate the film thickness of the fluid between the faces, comprising the steps of:
   initiating seal assembly operation with a given film thickness which produces excessive leakage;
   sensing one parameter of the system to provide a first signal which varies as a function of said one parameter;
   examining the first signal for an indication of a given phenomenon; and
   upon recognizing that a given phenomenon has occurred, increasing the film thicknes by a predetermined amount, thus providing seal assembly operation at an optimum film thickness.

* * * * *